United States Patent
Klein et al.

(10) Patent No.: US 6,840,579 B2
(45) Date of Patent: Jan. 11, 2005

(54) UNLOCKING DEVICE IN A VEHICLE SEAT

(75) Inventors: Mario Klein, Blumberg (DE); Eckhard Nock, Worms (DE); Richard Hänsel, Flonheim (DE); Martin Kraus, Katzenbach (DE)

(73) Assignee: Keiper GmbH & Co., Kaiserslautern (DE)

( * ) Notice: Subject to any disclaimer, the term of this patent is extended or adjusted under 35 U.S.C. 154(b) by 42 days.

(21) Appl. No.: 10/234,990

(22) Filed: Sep. 4, 2002

(65) Prior Publication Data

US 2003/0042780 A1 Mar. 6, 2003

(30) Foreign Application Priority Data

Sep. 5, 2001 (DE) ......................................... 101 43 403

(51) Int. Cl.[7] ................................................ B60N 2/02
(52) U.S. Cl. .................................. 297/367; 297/378.12
(58) Field of Search ............................ 297/378.12, 367

(56) References Cited

U.S. PATENT DOCUMENTS

| | | | | |
|---|---|---|---|---|
| 3,356,415 A | * | 12/1967 | Putsch ................... | 297/378.12 |
| 3,695,688 A | * | 10/1972 | Wize ........................... | 297/92 |
| 4,925,228 A | * | 5/1990 | Pipon et al. .............. | 296/65.06 |
| 5,154,476 A | * | 10/1992 | Haider et al. ................ | 297/367 |
| 5,419,616 A | * | 5/1995 | Paetzold ................. | 297/378.12 |
| 5,540,117 A | | 7/1996 | Hansel et al. | |
| 5,881,854 A | * | 3/1999 | Rougnon-Glasson ........ | 192/15 |
| 6,076,890 A | * | 6/2000 | Yoshida et al. ......... | 297/378.12 |
| 6,149,235 A | * | 11/2000 | Fahim ...................... | 297/259.2 |
| 6,328,382 B1 | * | 12/2001 | Yamashita ................... | 297/367 |
| 6,332,649 B1 | * | 12/2001 | Vossmann .................... | 297/366 |
| 6,336,679 B1 | * | 1/2002 | Smuk .................... | 297/378.12 |
| 6,338,532 B1 | * | 1/2002 | Sugimoto ................... | 297/367 |
| 6,598,938 B2 | * | 7/2003 | Boltze et al. ............... | 297/367 |

FOREIGN PATENT DOCUMENTS

DE            44 39 644 A1     6/1995

\* cited by examiner

*Primary Examiner*—Peter M. Cuomo
*Assistant Examiner*—Stephanie Harris

(57) ABSTRACT

In an unlocking device (21) in a vehicle seat, in particular an automobile seat, which is adapted for unlocking an adjuster or seat mounting (5), the unlocking device (21) comprises an unlocking element (27) extending into the adjuster or seat mounting (5), with the unlocking element (27) being mounted on a pivotally supported entrainment member (25) arranged on the outside of the adjuster or seat mounting (5).

20 Claims, 3 Drawing Sheets

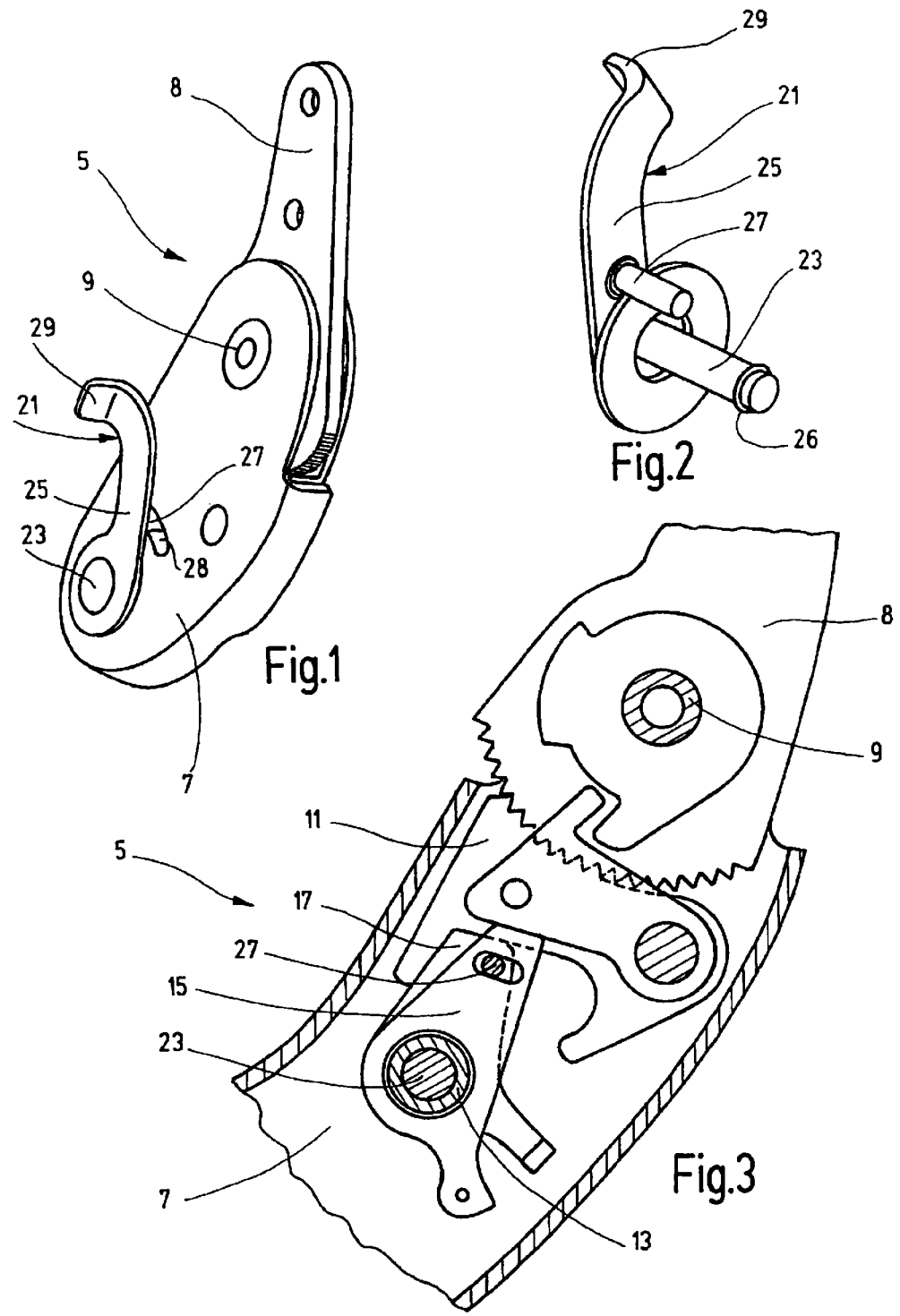

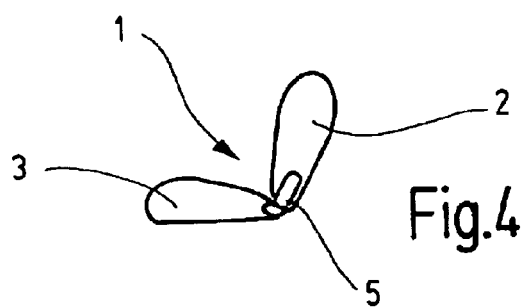
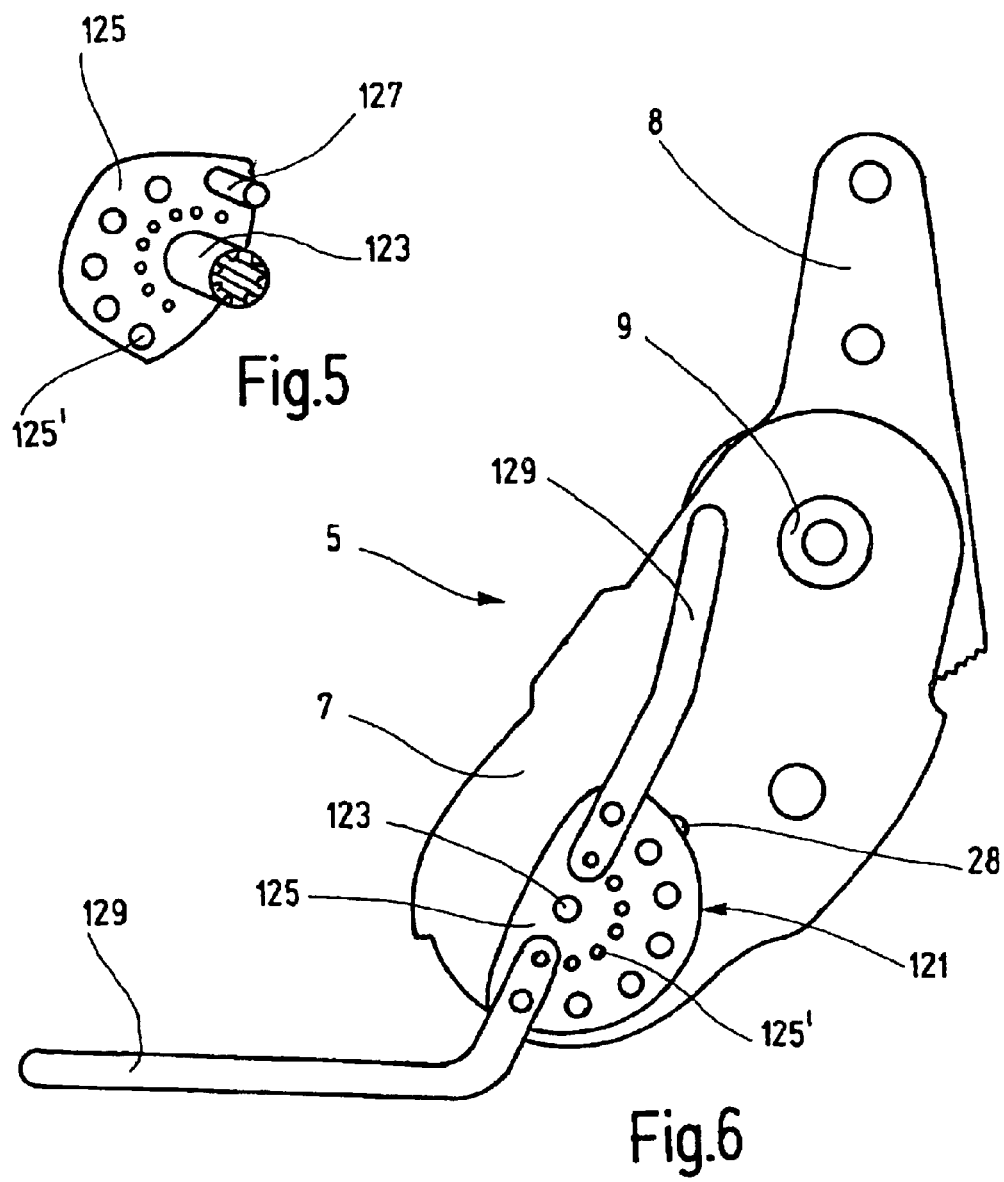

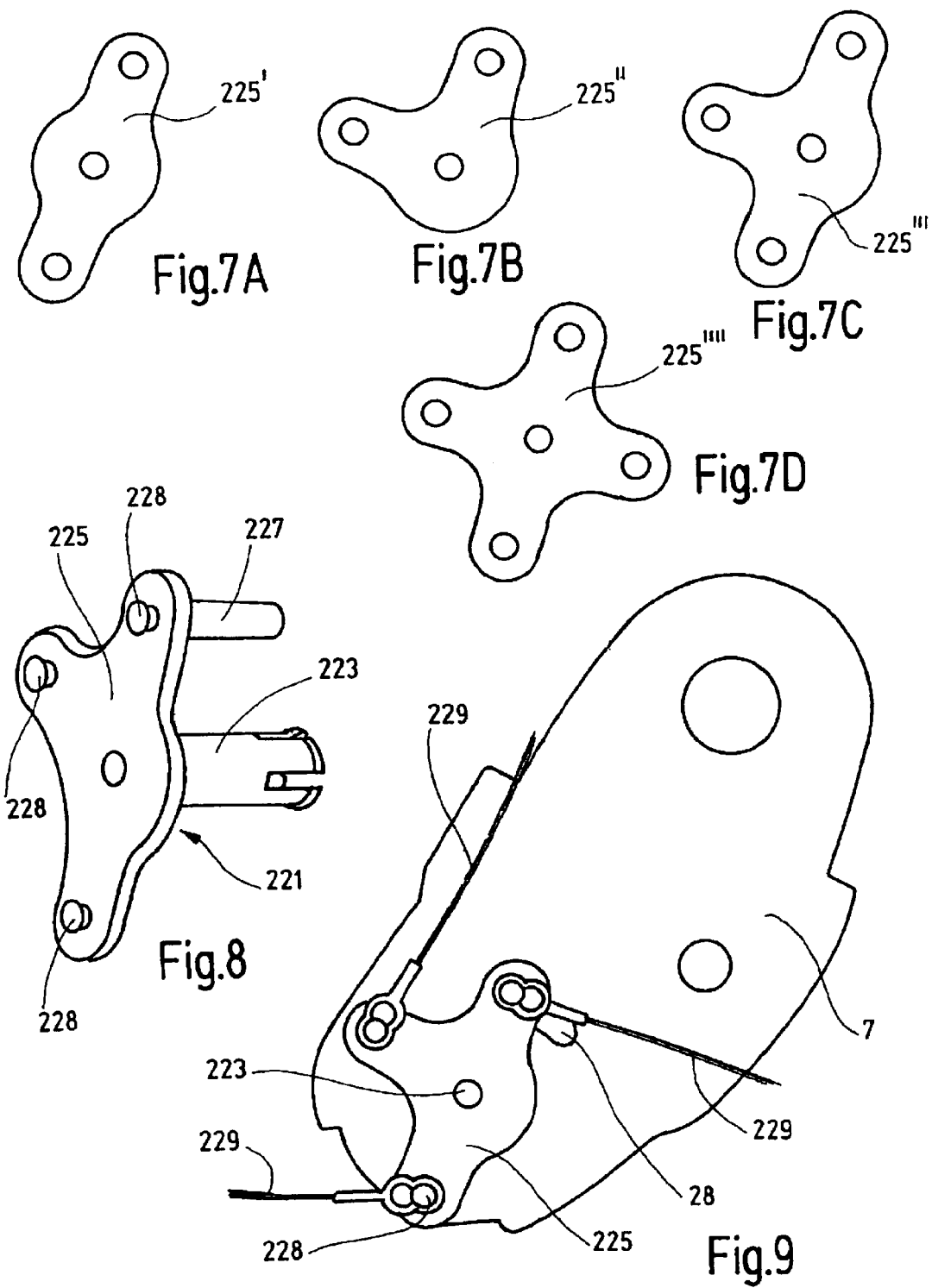

UNLOCKING DEVICE IN A VEHICLE SEAT

BACKGROUND OF THE INVENTION

The present invention relates to an unlocking device in a vehicle seat and, more particularly, to an unlocking device adapted for unlocking an adjuster of the vehicle seat or a seat mounting of the vehicle seat.

In the case of pawl locking devices, such as are used in adjusters or seat mountings, it is known to use an unlocking device for retracting various safety elements from the pawl, so that same is able to open. For example, in the case of a locking mechanism for a freely pivotable seat back with clamping and catching elements for securing a locking pawl, as is disclosed in DE 44 39 644 C2, an unlocking occurs by a Bowden cable that engages a catching element. Normally, the Bowden cable is attached to an unlocking pin that is made integral with the catching element and projects from the locking mechanism through a guide slot. Depending on the engaging torque and existing play, the movement of the unlocking pin crosswise to its longitudinal axis can become difficult.

BRIEF SUMMARY OF THE INVENTION

One aspect of the present invention is the provision of an improved unlocking device that is adapted for unlocking a locking mechanism (e.g., an adjuster or seat mounting) of a vehicle seat, in particular an automobile seat. In accordance with this aspect, the unlocking device includes an unlocking element that is carried by a pivotally supported entrainment member. The entrainment member is arranged outside of the locking mechanism for pivoting relative to the locking mechanism. The unlocking element is mounted on the entrainment member for pivoting with the entrainment member, with the unlocking element extending into the locking mechanism so that the pivoting of the entrainment member causes the unlocking element to move within the locking mechanism and thereby unlock the locking mechanism.

As a result of providing the unlocking device with an unlocking element, which engages the locking mechanism, e.g. the adjuster or seat mounting, and which is arranged on an entrainment member pivotally supported on the outside of the adjuster or seat mounting, for example, on an arm of the entrainment member, an easy actuation movement of the unlocking element is attained without a risk of jamming, in particular within the adjuster. Such jamming is common in the prior art, according to which the unlocking element is arranged within the adjuster or seat mounting, for example, on a thin locking element unilaterally projecting therefrom.

The arrangement of the unlocking device on the outside avoids damage to the unlocking element during transportation. Furthermore, both the arrangement of the unlocking device on different sides of an adjuster and the connection of actuation elements may occur in adaptation to predetermined requirements, without having to modify the existing adjuster or seat mounting in its interior.

Depending on requirements, in particular in the case of different actuation possibilities and with the use of the same unlocking device in different vehicle seats, the entrainment member preferably comprises a corresponding number of arms for the unlocking elements and the actuation element or elements. The entrainment member may be selected as a perforated disk or as a set of several entrainment members with a different number of arms.

Preferably, the unlocking device is supported in a bushing of the adjuster or seat mounting, which preferably serves at the same time as a support of one or more locking elements that are to be moved by the unlocking element, so that it is possible to perform a synchronous pivotal movement. The larger diameter of the bushing and bearing pin or the bushing of the unlocking device allows for a smoother running. The axial locking engagement of the bearing pin or bushing may occur by open snap rings, spring rings with different cross sectional profiles and configurations, clip connections, or the like. Preferred are such axial locking engagements which are not acted upon by any opening forces and moments in the case of use.

The preferably manually operable unlocking device may be used for different, lockable arrangements, such as, for example, adjusters or releasable seat mountings in the seat legs of rear seat rows, in particular for those whose unlocking procedure is initiated with a pivotal movement of a locking element.

BRIEF DESCRIPTION OF THE SEVERAL VIEWS OF THE DRAWINGS

In the following, the invention is described in greater detail with reference to three embodiments illustrated in the drawings, in which:

FIG. 1 is a perspective view of an adjuster with an unlocking device according to a first embodiment;

FIG. 2 is a further perspective view of the unlocking device of FIG. 1;

FIG. 3 is an axially sectioned view of the adjuster of FIG. 1;

FIG. 4 is a schematic view of a vehicle seat;

FIG. 5 is a perspective view of parts of an unlocking device according to a second embodiment;

FIG. 6 is a side view of an adjuster with the unlocking device of FIG. 5;

FIGS. 7A–7D are views of different entrainment members;

FIG. 8 is a perspective view of parts of an unlocking device according to a third embodiment; and FIG. 9 is a side view of an adjuster with the unlocking device of FIG. 8.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

A vehicle seat 1, which is constructed as a folding rear seat of an automobile, comprises on both sides an adjuster 5 for adjusting the inclination of its seat back 2 relative to its seat portion 3. The adjuster 5, which is constructed as a locking mechanism, comprises a lower member 7, which is made integral with the seat portion, and an upper member 8, which is made integral with the seat back and adapted for pivoting about a seat back pin 9 supported in the lower member 7. The lower member 7 consists of two plate-shaped, parallel arranged elements, which define a space for receiving the portion of upper member 8 that surrounds the pin 9, and different locking and safety elements.

A pawl 11, which is supported on lower member 7, cooperates with a gear toothed segment of upper member 8 for purposes of locking the adjuster 5. In the normal use, the pawl 11 is secured in a known manner by a spring-loaded clamping element 15 that is supported on a bushing 13 and acts upon the pawl 11 via a radial cam. At both ends, a bushing 13 extends to the outer sides of the lower member 7, and is secured in the axial direction by a flange or a rivet head. A spring-loaded catching element 17 is likewise supported on bushing 13. The catching element 17 supports, in the event of a crash, the pawl 11 with a flat contact surface for purposes of maintaining the gear tooth engagement.

An unlocking device 21 of the first embodiment comprises a bearing pin 23, which is inserted from the outside into the bushing 13, and supported therein. At its one end, the bearing pin 23 mounts an arm-shaped entrainment member 25. At its other end, an open locking ring 26 is inserted for a locking engagement in the axial direction, and in part immersed inside an annular groove of the bearing pin 23. To avoid lateral deflection movements under loads, such a locking ring 26, which consists of a spring steel, may have a square material cross section. However, the locking ring 26 may also be constructed as an oval, annular spring, which is compressible only by radial but not by axial forces, when being inserted.

From the entrainment member 25 arranged on the outside of lower member 7, an unlocking pin 27 welded thereto projects as an unlocking element parallel to bearing pin 23. It extends through a guide slot 28 of lower member 7, and is firmly seated in an opening of catching element 17. At the same time, the unlocking pin 27 forms a part of a slot-pin-guideway for coupling catching element 17 and clamping element 15. At a distance from bearing pin 23, which is greater than the spacing between the bearing pin 23 and unlocking pin 27, the entrainment member 25 mounts an actuation finger 29 integral therewith, which may be provided with a handle. Thus, it is possible to transmit the actuation force upon the catching element 17 with one hand.

By pivoting the entrainment member 25 of the unlocking device 21 about the axis of rotation that is defined by bushing 13 and bearing pin 23, the unlocking pin 27 moves catching pin 17, and entrains clamping element 15, which in turn releases the pawl 11, so as to unlock the adjuster 5. After releasing the entrainment member 25, a locking engagement occurs as a result of the spring loads of the components involved.

An unlocking element 121 of the second embodiment, which unlocks the same adjuster 5 in the same way as in the first embodiment via the catching element 17, comprises a disk-shaped entrainment member 125 with a plurality of openings 125'. The entrainment member 125 is mounted on a bushing 123 inserted into the bushing 13. The bushing 123 is arranged on a side of the vehicle seat for receiving in corotational relationship a transmission rod (not shown) extending to the adjuster 5 from the other side of the vehicle seat. In a modified variant, the first embodiment may comprise a corresponding bushing. The axial locking engagement of entrainment member 125 occurs, for example, by providing the bushing 123 in the form of a straddling dowel or by a locking ring as in the first embodiment.

Pressed into one of the openings 125' is an unlocking pin 127, which is similar to that of the first embodiment as regards its function and its design and orientation. By means of two openings 125', the entrainment member 125 mounts two actuation levers 129 each in corotational relationship therewith, which make it possible to actuate the unlocking device 121 from two different directions. The angle between the two effective directions of the actuation levers 129 can be selected depending on need. In a modified variant, the transmission rod is arranged on one of the actuation levers 129 in offset relationship with bushing 13.

In a third embodiment, the unlocking device 221, which unlocks the adjuster 5 in the same way as in the first embodiment via the catching element 17, comprises an entrainment member 225 mounted on a bushing 223. The entrainment member 225 can be selected in a modular way from a set of different two-arm, three-arm, or four-arm entrainment members 225', 225'', 225''', or 225''''. One arm of entrainment member 225 mounts an unlocking pin 227, which is similar to that of the first embodiment as regards its function and its design and orientation.

The same arm and/or the further arms of entrainment member 225 are each provided with a projecting cam 228. By means of an eyelet, each cam mounts an actuation cable 229, for example, the core of a Bowden cable. By means of these actuation cables 229, it is possible to rotate the entrainment member 225 from the upper edge of the seat back, from the front, and/or from the trunk, i.e. to actuate the unlocking device 221, and to thus unlock the adjuster 5. In the place of the cams 228, it is also possible to provide bores (e.g., openings) for attaching the actuation cables 229. In the place of the actuation cables, it is also possible to arrange a rod assembly. Depending on the geometry and effective directions of the actuation cables 229, an angle between the arms of the entrainment member 225, which deviates from 90°, i.e., for example, 75°, can effect a better introduction of force.

In the same way as in the second embodiment, the bushing 223 is used for receiving a transmission rod in corotational relationship therewith. For an axial locking engagement of the entrainment member 225, which is preferably made of zinc by pressure die casting, the bushing 223 is slotted on its side facing away from entrainment member 225 and constructed as a clip with a plurality of elastic tongues and noses, which are able to engage the bushing 13 that forms an undercut. However, it is also possible to lock the bushing 223 in the same way as in the first embodiment by a locking ring on the side facing away from the entrainment member 225.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An unlocking device adapted for unlocking a locking mechanism of a vehicle seat, with the locking mechanism being an adjuster for the vehicle seat or a seat mounting for the vehicle seat, the unlocking device comprising:

a pivotally supported entrainment member arranged outside of the locking mechanism for pivoting relative to the locking mechanism; and an unlocking element mounted on the entrainment member for pivoting with the entrainment member, with the unlocking element extending into the locking mechanism so that the pivoting of the entrainment member causes the unlocking element to move within the locking mechanism and thereby unlock the locking mechanism, wherein the entrainment member is supported in a bushing of the locking mechanism.

2. An unlocking device according to claim 1, wherein the entrainment member comprises a single arm, the arm mounts both the unlocking element and an actuation finger, and the actuation finger extends from the arm and is for being moved in a manner that causes the pivoting of the entrainment member.

3. An unlocking device according to claim 1, wherein the entrainment member is at least generally in the form of a disk that provides a plurality of arrangement possibilities for at least one of the unlocking element and an actuation element, wherein the actuation element is for being mounted to and extending from the entrainment member, so that the actuation element can be moved in a manner that causes the pivoting of the entrainment member.

4. An unlocking device adapted for unlocking a locking mechanism of a vehicle seat, with the locking mechanism being an adjuster for the vehicle seat or a seat mounting for the vehicle seat, the unlocking device comprising:

a pivotally supported entrainment member arranged outside of the locking mechanism for pivoting relative to the locking mechanism; and an unlocking element mounted on the entrainment member for pivoting with the entrainment member, with the unlocking element extending into the locking mechanism so that the pivoting of the entrainment member causes the unlocking element to move within the locking mechanism and thereby unlock the locking mechanism, wherein:

the entrainment member can be selected from a set of entrainment members, with each of the entrainment members including a plurality of arms, for each of the entrainment members, each of the arms is for having an actuation element mounted thereto so that the actuation element can be moved in a manner that causes the pivoting of the entrainment member, and the entrainment members are different from one another, at least with respect to number of, or configuration of, arms.

5. An unlocking device adapted for unlocking a locking mechanism of a vehicle seat, with the locking mechanism being an adjuster for the vehicle seat or a seat mounting for the vehicle seat, the unlocking device comprising:

a pivotally supported entrainment member arranged outside of the locking mechanism for pivoting relative to the locking mechanism; and an unlocking element mounted on the entrainment member for pivoting with the entrainment member, with the unlocking element extending into the locking mechanism so that the pivoting of the entrainment member causes the unlocking element to move within the locking mechanism and thereby unlock the locking mechanism, wherein:

the entrainment member includes a plurality of mounts to which an actuation element can be mounted, the actuation element can be mounted to at least a first of the mounts so that the actuation element can be moved in a first direction to cause the pivoting of the entrainment member, or the actuation element can be mounted to at least a second of the mounts so that the actuation element can be moved in a second direction to cause the pivoting of the entrainment member, and the first and second directions are different from one another by virtue of the first and second mounts being angularly displaced from one another about the pivoting axis of the entrainment member.

6. An unlocking device according claim 4, wherein the entrainment member is supported in a bushing of the locking mechanism.

7. An unlocking device according to claim 1, wherein a bearing pin is provided on the entrainment member, and the bearing pin is for supporting the entrainment member, with the bearing pin being axially secured by a circular or oval locking ring.

8. An unlocking device, adapted for unlocking a locking mechanism of a vehicle seat, with the locking mechanism being an adjuster for the vehicle seat or a seat mounting for the vehicle seat, the unlocking device comprising:

a pivotally supported entrainment member arranged outside of the locking mechanism for pivoting relative to the locking mechanism; and an unlocking element mounted on the entrainment member for pivoting with the entrainment member, with the unlocking element extending into the locking mechanism so that the pivoting of the entrainment member causes the unlocking element to move within the locking mechanism and thereby unlock the locking mechanism, wherein a bushing is provided on the entrainment member, the bushing is for supporting the entrainment member, and the bushing is axially secured by a clip connection.

9. An unlocking device according claim 1, wherein the unlocking device is adapted for manual actuation.

10. An unlocking device according to claim 1, wherein the unlocking device, the locking mechanism, and the vehicle seat are in combination with one another.

11. A combination according to claim 10, wherein the locking mechanism connects a seat portion of the vehicle seat to a seat back of the vehicle seat, and the locking mechanism is an adjuster for adjusting an inclination of the seat back relative to the seat portion.

12. An unlocking device according claim 8, wherein the entrainment member is supported in a bushing of the locking mechanism.

13. An unlocking device according to claim 5, wherein the mounts are respectively arranged at arms of the entrainment member.

14. An unlocking device according to claim 5, wherein the entrainment member is at least generally disk-shaped.

15. An unlocking device according to claim 5, wherein the mounts are selected from a group consisting of openings and projecting elements.

16. An unlocking device according to claim 5, wherein the entrainment member is supported in a bushing of the locking mechanism.

17. An unlocking device according to claim 1, wherein the unlocking device is adapted for manual actuation.

18. An unlocking device, adapted for unlocking a locking mechanism of a vehicle seat, with the locking mechanism being an adjuster for the vehicle seat or a seat mounting for the vehicle seat, the unlocking device comprising:

a pivotally supported entrainment member arranged outside of the locking mechanism for pivoting relative to the locking mechanism; and an unlocking element mounted on the entrainment member for pivoting with the entrainment member, with the unlocking element extending into the locking mechanism so that the pivoting of the entrainment member causes the unlocking element to move within the locking mechanism and thereby unlock the locking mechanism, wherein:
the entrainment member includes a plurality of mounts to which a plurality of actuation elements are respectively mounted, a first of the actuation elements is mounted to at least a first of the mounts so that the first actuation element can be moved in a first direction to cause the pivoting of the entrainment member, and a second of the actuation elements is mounted to at least a second of the mounts so that the second actuation element can be moved in a second direction to cause the pivoting of the entrainment member, and the first and second directions are different from one another by virtue of the first and second mounts being angularly displaced from one another about the pivoting axis of the entrainment member, whereby the unlocking device can be actuated from different directions.

19. An unlocking device according to claim 18, wherein the mounts are selected from a group consisting of openings and projecting elements, and the mounts are greater in number than the actuation elements such that some of the mounts are not utilized for mounting the actuation elements.

20. An unlocking device according claim 18, wherein the unlocking device is adapted for manual actuation via either manually moving the first actuation element in the first direction or manually moving the second actuation element in the second direction.

* * * * *